United States Patent
McMillan et al.

(10) Patent No.: US 12,407,666 B2
(45) Date of Patent: Sep. 2, 2025

(54) RECOVERY REQUEST

(71) Applicant: Hewlett-Packard Development Company, L.P., Spring, TX (US)

(72) Inventors: Erich Wolfgang Gestacker McMillan, Spring, TX (US); Tevin Jaupaul Richards, Spring, TX (US); Baraneedharan Anbazhagan, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 18/684,768

(22) PCT Filed: Sep. 22, 2021

(86) PCT No.: PCT/US2021/051451
§ 371 (c)(1),
(2) Date: Feb. 19, 2024

(87) PCT Pub. No.: WO2023/048704
PCT Pub. Date: Mar. 30, 2023

(65) Prior Publication Data
US 2025/0030674 A1    Jan. 23, 2025

(51) Int. Cl.
*H04L 9/40*    (2022.01)
*G06F 21/57*    (2013.01)

(52) U.S. Cl.
CPC ............ *H04L 63/08* (2013.01); *G06F 21/575* (2013.01); *H04L 63/0428* (2013.01)

(58) Field of Classification Search
CPC .................. G06F 21/575; G06F 21/44; G06F 2221/2131; H04L 63/08; H04L 63/0428
See application file for complete search history.

(56) References Cited

U.S. PATENT DOCUMENTS

| | | |
|---|---|---|
| 8,407,768 B1 | 3/2013 | Hayter |
| 8,407,773 B1 | 3/2013 | Hayter et al. |
| 9,137,225 B2 | 9/2015 | Kulkarni et al. |
| 9,742,568 B2 | 8/2017 | Rao et al. |
| 10,534,620 B2 | 1/2020 | Samuel et al. |
| 2008/0028235 A1 | 1/2008 | Smith et al. |
| 2010/0266132 A1 | 10/2010 | Bablani et al. |
| 2017/0317824 A1 | 11/2017 | Brown |
| 2018/0278612 A1 | 9/2018 | Pattar et al. |
| 2019/0013942 A1 | 1/2019 | Brown |
| 2022/0308891 A1* | 9/2022 | Medeiros .............. G06F 21/572 |
| 2024/0064027 A1* | 2/2024 | Tie ...................... H04W 12/069 |
| 2024/0430095 A1* | 12/2024 | McMillan ........... H04L 63/0272 |

FOREIGN PATENT DOCUMENTS

WO    2020/028909 A1    2/2020

* cited by examiner

*Primary Examiner* — Benjamin A Kaplan
(74) *Attorney, Agent, or Firm* — Quarles & Brady LLP

(57) ABSTRACT

An example storage medium is described, wherein the storage medium comprises instructions that, when executed cause a processor of an electronic device to store authentication data in a first memory of the electronic device. Upon detecting a failure to decrypt information, the processor is to perform an authentication with a webservice, receive a recovery code, and input the recovery code to a recovery service. The recovery code is obscured from the user.

15 Claims, 7 Drawing Sheets

RECOVERY REQUEST

BACKGROUND

Computing devices such as desktop computers, notebook computers, tablets, smart phones, etc, include instructions stored in a memory that are to initialize hardware in the computing device. Initializing hardware may include initializing storage devices that are encrypted to provide security for the data stored in the storage devices.

BRIEF DESCRIPTION OF THE DRAWINGS

Various example features will be apparent from the detailed description which follows, taken in conjunction with the accompanying drawings, wherein:

FIG. 1b is an example method of operation of the electronic device of FIG. 1a.

FIG. 2b is an example method of operation of the electronic device of FIG. 2a.

FIG. 3b is an example method of operation of the electronic device of FIG. 3a.

FIG. 4 is an example method of operation of the electronic device of FIG. 1a or FIG. 3a.

DETAILED DESCRIPTION

For security reasons, storage devices for computing devices may employ encryption wherein the contents of the storage device are encrypted prior to storage so that unauthorized access of the contents can be blocked. An example of such an encryption system is Bitlocker™. Encrypted storage devices can be accessed by a password to be input under certain circumstances. To avoid a user needing to input the password each time that they wish to access data in the storage device, a password can be held in a secure storage unit of the computing device. An example of such a secure storage unit is a Trusted Platform Module (TPM), in which data is stored either in a dedicated integrated circuit or in a secure part of an integrated circuit. The data is stored in a manner in which it is not easily accessible other than under specific conditions, such as being accessible to certain parts of the BIOS during the boot process.

During the device's boot process, the BIOS can sense that the password should be input to enable decryption of the storage device and so may request the stored password from the secure storage.

To block unauthorised access to the encrypted data, for example by tampering with the BIOS, a system for checking that the BIOS is in an expected state may be applied. However, when a computer device is modified during an update process, the updates may alter the BIOS. In such a situation, the system for checking the BIOS may assume that this alteration is a result of an unauthorised access attempt. Upon detection of the supposed unauthorised access, a password may be requested before decryption of the data is permitted.

Input of the password may be, for example, via manual input or via some automatic input. Manual input of the password is cumbersome for the user since the password maybe rather long. Moreover, the user may store the password, for example by writing it down, and this compromises the security of the encryption system. Automatic password input can be implemented using a server device connected to the computer via a network. However, in the absence of an available network, such an automatic input would fail. Further, in a situation where a remote administrator is attempting to update a computing device over a network, an update that changed the BIOS may block the administrator from completing the update. This is because remote insertion of the password may not be possible.

The disclosure described herein may permit a recovery code for an electronic device to be input in a secure manner without divulging the recovery code to a user, and without requiring an administrator to intervene either at the device or remotely via a network connection.

Figure 1A:
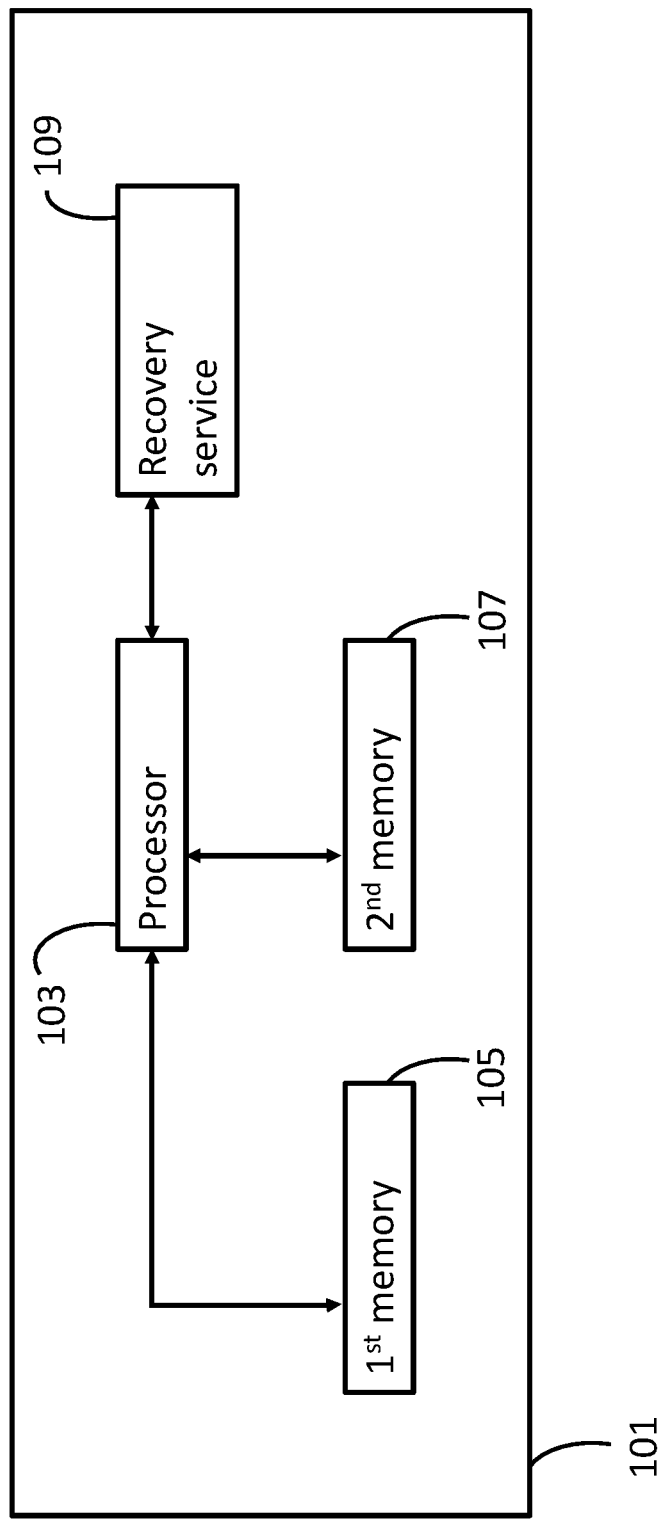
FIG. 1a is a block diagram of an example electronic device.

Referring to the Figures, FIG. 1a illustrates a block diagram of an example electronic device 101, such as a computer device. The electronic device 101 may comprise a processor 103, a first memory 105, a second memory 107, and a recovery service 109. The processor 103 is able to execute instructions that enable the performance of a task. The instructions may be stored on a non-transitory computer-readable storage medium. As used in this disclosure, the term "non-transitory" does not encompass transitory propagating signals.

As indicated in FIG. 1a, the processor 103 is able to communicate data between itself and each of the memories 105, 107, and also with the recovery service 109.

Figure 1B:
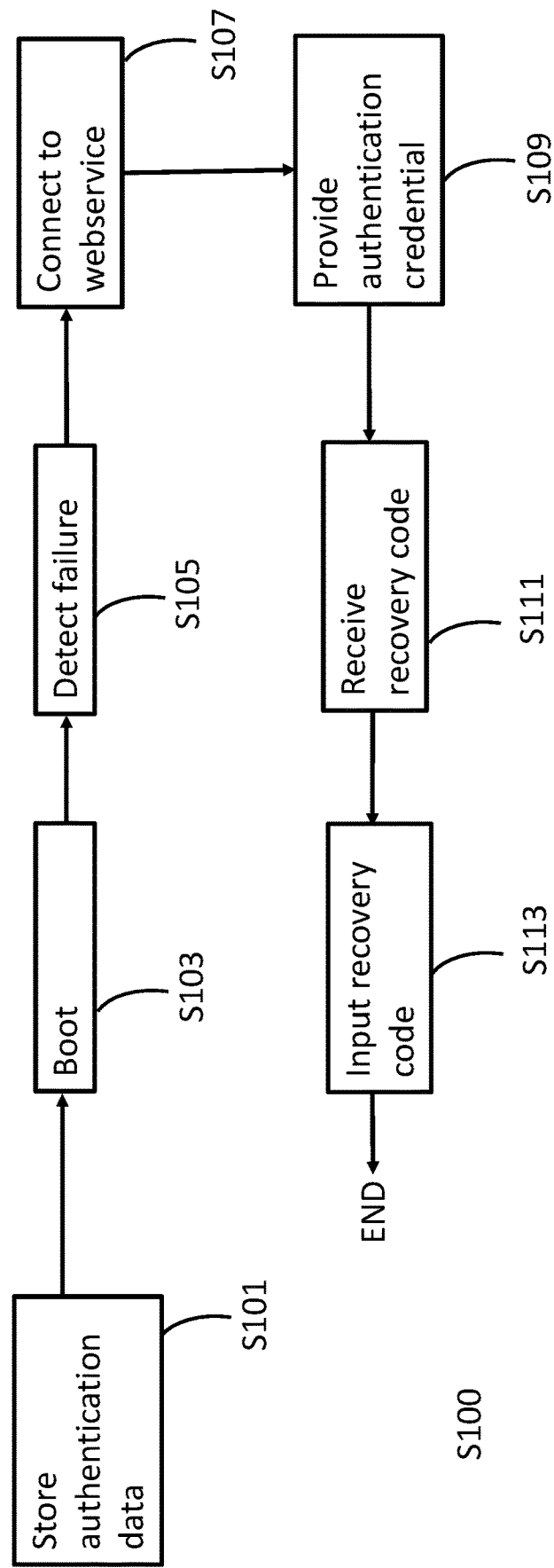

FIG. 1b illustrates an example method S100 of operation of the electronic device 101 of FIG. 1a. At S101 the processor 103 stores authentication data in the first memory 105. In some examples, the first memory 105 may be a secure memory wherein access to the memory is in some way limited or restricted. For example, a secure memory device may be inaccessible to a certain part e.g. processors of the electronic device, or may request a password be supplied before access is granted.

Authentication data corresponds to data that can identify the electronic device 101 to the webservice. In examples, the authentication data may comprise a private key, an electronic certificate generated using a private key, an IP address, a media access control (MAC) address, a globally unique identifier (GUID), or any other data that can be used to uniquely identify the electronic device 101 within a network of devices. In some examples, the authentication data can be based on an identifier of a network communication device that forms a part of the electronic device 101.

The storage S101 of the authentication data may be accomplished prior to issuing the electronic device 101 to a user. For example, a system administrator may store the authentication data when first setting up the electronic device 101 for a user. The authentication data may also be stored via a local intervention of an administrator such as by manually storing the authentication data, for example using a universal serial bus (USB) memory device. Alternatively, the authentication data may be stored by remote intervention wherein an administrator stores the authentication data via a network connection.

At S103, the electronic device 101 is booted from an inactive state. A boot process of the electronic device may be the process by which the device is started up from an unpowered state. The boot process may, for example, involve the electronic device running machine readable instructions that initiates the system using a basic input/output system (BIOS).

As used herein, BIOS refers to hardware or hardware and instructions to initialize, control, or operate a computing device prior to execution of an operating system OS of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Upon booting S103 of the electronic device 101, instructions are executed on the processor 103 of the device 101 to initiate the device 101. The device initiation may include instructions to obtain data from the second memory 107 to complete initiation of the electronic device 101.

Processors, such as example processor 103, may include hardware devices such as Central Processor Units (CPUs), Embedded Controllers (ECs), other general processors and co-processors. As used herein, an EC corresponds to a controller device that is within an electronic device and that performs a processing task. Processors may also include software devices wherein one or more virtual processors are to operate on integrated circuits. Processors may include threads of software that operate on such an integrated circuit. As used herein, software is machine readable instructions. Such instructions are executable by a controller or a processor, such as processor 103. Processors may be remote from the physical computer device and connected to the computer device via a wired or wireless network connection. Processors may be single-core or multicore processors, and different controllers may be implemented on different cores of a multicore processor.

In some examples, where the processor 103 comprises an EC, then the EC may be to provide services that are available during boot-up of the electronic device. For example, the EC may be to provide network communication capability during the boot process, prior to loading of an operating system. Such network capability may include Ethernet, cellular communications such as 4G and 5G, Wi-Fi, Bluetooth, etc.

Memory devices 105, 107 of examples may include any electronic storage devices or memories including semiconductor-based random-access memory (RAM), magnetic discs, and magnetic tapes, optical discs. Memory devices may also include Read-Only Memory (ROM), such as semiconductor-based ROM. Memory devices may also include erasable programmable read-only memory (EPROM), and electronically erasable programmable read-only memory (EEPROM)

Memory devices 105, 107 may be integrated into the electronic device 101 or removable from it. Memory devices 105, 107 may also be partitioned into different sections, and so more than one of the memory devices as described in this disclosure may be implemented within a single physical device. Thus, for example, the first memory 105 and the second memory 107 may each be a partition of a single memory.

Memory devices 105, 107 may also be remote from the physical computer device, such as being present in a cloud storage device. Memory devices 105, 107 may also be secure devices wherein access to the memory is in some way limited or restricted. For example, memory devices 105, 107 may be inaccessible to a certain part e.g. a certain processor of the electronic device or may request a password be supplied before access is granted.

In examples, the data to be obtained from the second memory 107 may comprise parts of an operating system for the electronic device 101, or other data for operation of the electronic device 101. The data in the second memory 107 is, in some examples, encrypted with an encryption system that renders the data unreadable to the processor 103 without prior decryption. As a result, at S105, when attempting to obtain the data from the second memory 107, the processor 103 will detect that there is a failure to decrypt the data from the second memory 107 if the decryption has been blocked.

In some examples, the cause of the failure to decrypt the data may be because machine readable instructions in the electronic device 101 have detected an event, such as a change to the device BIOS. Although such a change may occur merely as the result of an update made to the device software or hardware, such a change can also be representative of an indication that unauthorised access to the data has been attempted. Thus, for reasons of security, a change to the device BIOS may trigger a request for input of a password. Such a request may result in a failure to decrypt the data until the requested password is input.

Upon detecting S105 the failure to decrypt the data in the second memory 107, at S107, the processor 103 connects to a webservice via a network connection. In examples, the processor 103 initiates the network connection to the webservice. In other examples, the initiation may be performed over a pre-existing network connection, in further examples, the network connection may be established as a result of detection S105 of the failure. In still further examples, the webservice may establish the connection upon receipt of a message from another device. In such examples, the message from the remote device may indicate that the processor 103 has detected S105 the failure.

A webservice can correspond to an electronic device, such as a server that is capable of transmitting a recovery code over a network in response to receipt, via the network, of an authentication credential.

The network connection may be implemented via any networking technology, such as ethernet, Wi-Fi, cellular communications, or Bluetooth.

At S109, the processor 103 then provides, via the network connection, an authentication credential to the webservice using the stored authentication data. In some examples, the webservice may transmit a request message to the processor 103, wherein the request message includes information requesting the authentication credential of the electronic device 101. In other examples, the processor 103 may provide S109 the authentication credential by transmitting a message containing the authentication credential to the webservice without prior request from the webservice.

An authentication credential comprises information to identify the electronic device 101 and may be generated using the authentication data. The authentication credential may correspond to an electronic certificate generated using a private key, such as a private key stored in the electronic device 101 or any other data that can uniquely identify the electronic device 101 within a network of devices.

Upon receipt of the authentication credential, the webservice may examine the credential to determine whether the electronic device 101 is correctly authenticated. In examples, the examination of authentication credential comprises comparing the authentication credential with a stored list of valid authentication details. In other examples, where the authentication credential comprises a digital certificate, the examination comprises using a public encryption key to validate the certificate. In some examples, information from a remote certificate issuing authority is used during the validation process.

In some examples, the webservice may also determine whether a recovery request has been received from another electronic device in relation to the electronic device 101. In such examples, the determination includes a determination as to whether a recovery request including information identifying the electronic device 101 has been received at the webservice from the other electronic device. In some examples, the information identifying the electronic device 101 comprises an IP address, a media access control (MAC) address, a globally unique identifier (GUID), or any other data that can be used to uniquely identify, within a network of devices, the electronic device 101 to which the request relates.

In examples, if the examination of the authentication credential indicates that the electronic device 101 is authenticated and the recovery request has been received, then the webservice issues a recovery code for the second memory 107 and transmits a message including the recovery code via the network connection. Thus, the recovery code is based on the received recovery request.

At S111, the processor 103 receives, via the network connection, the recovery code from the web service. At S113, the processor 103 inputs the recovery code to the recovery service 109.

The recovery code is input S113 using a virtual keystroke in a manner wherein the recovery code is obscured from a user. The recovery service 109 is to decrypt the data stored in the second memory 107. In examples, the virtual keystroke may be generated by the processor 103. In such examples, the processor 103 may comprise an embedded controller (EC). In examples, the virtual keystroke may be generated in a password entry screen of the electronic device with the keystroke replaced by a substituted character. The substituted character may be a blank space. In some examples, the character is input using a same color as the background thereby rendering it obscured to the user. In some examples, the virtual keystroke may be implemented by an EC providing instructions to a keyboard controller of the electronic device. In examples, a plurality of keystrokes may be input.

In some examples, the recovery service 109 comprises instructions running on the processor 103 that is to control access to the second memory 107. In other examples, the recovery service may be implemented on a separate processor.

In some examples, the detection of the failure to decrypt data stored in the second memory 107 may be based on the receipt of a keystroke to a keypad of the electronic device 101. Thus, in such examples, a user is able to manually trigger the process of obtaining a recovery code for the electronic device 101.

In other examples, the detection of the failure to decrypt data stored in the second memory 107 may be based on the processor 103 detecting that input of a recovery code is being requested by a controller of the electronic device 101. In examples, the request may be based on a determination that the electronic device 101 is operating in a state in which a password entry screen is displayed to a user.

In some examples, where the network connection is provided via a cellular connection, the network connection may be implemented using 4G or 5G technology. The network connection may be provided via a cellular communication device that is part of the electronic device 101. In some examples, where the processor 103 comprises an EC, the EC may control the cellular communication device.

Figure 2A:
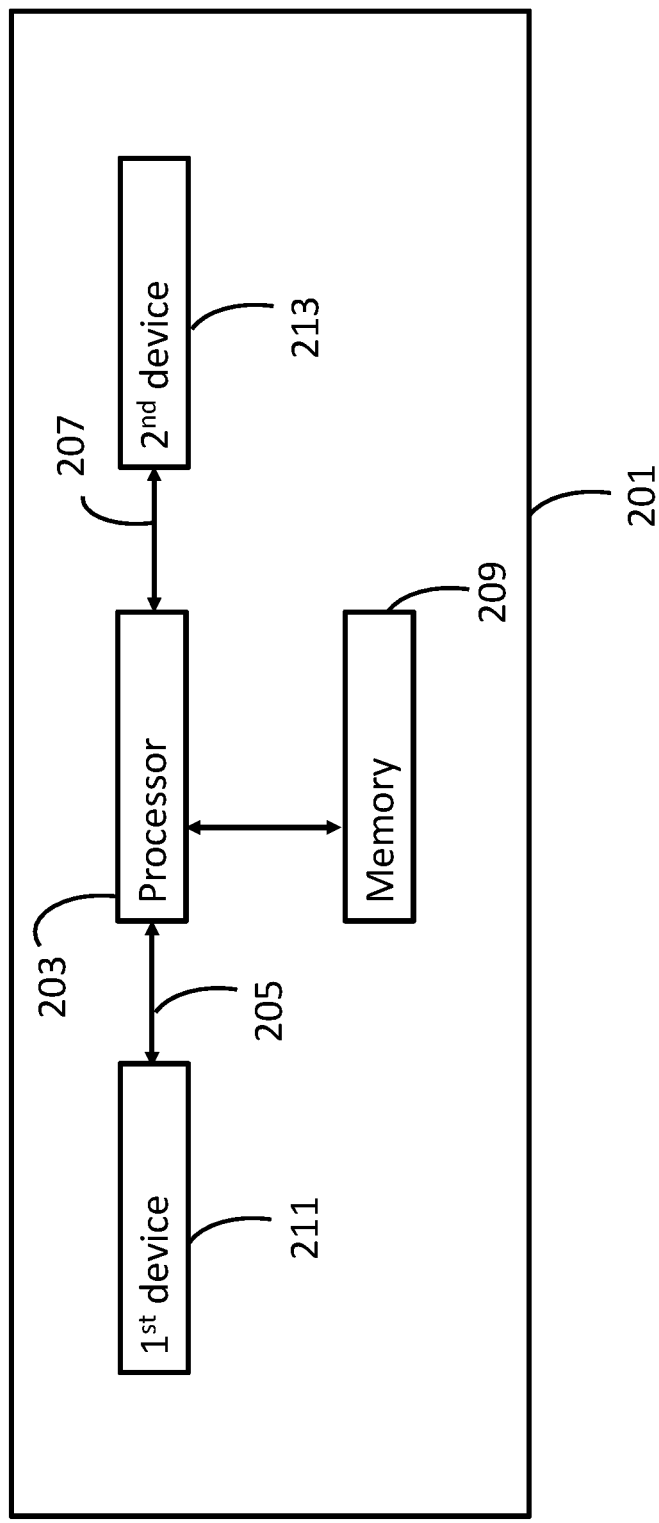
FIG. 2a is a block diagram of another example electronic device.

FIG. 2*a* illustrates a block diagram of a device 201, for example a webservice device, for providing a webservice. In examples, the device 201 comprises a computer device, such as a webserver. The device 201 comprises a processor 203 and a memory 209. Processor 203 is to provide a first network connection 205 and a second network connection 207. The memory 209 is to store a recovery code and data related to identification of an electronic device.

Figure 2B:
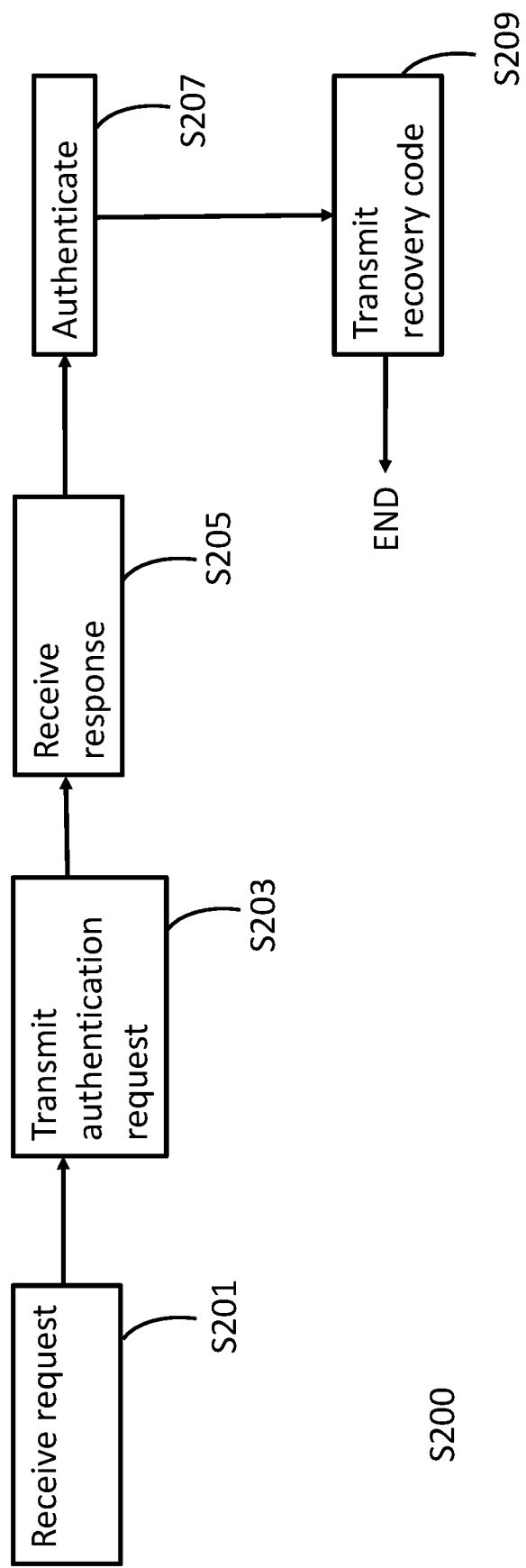

FIG. 2*b* illustrates an example method S200 of operation of the device 201 of FIG. 2*a*. At S201, the device 201 receives a request for a recovery code from a first device 211 via the first network connection 205. In examples, the request comprises information identifying a second device 213 to which the request relates. In examples, the information comprises an IP address, a media access control (MAC) address, a globally unique identifier (GUID), or any other data that can be used to uniquely identify, within a network of devices, the electronic device to which the request relates.

At S203, in response to the request for a recovery code, the processor 203 transmits an authentication request to the second device 213 via a second network connection 207. The second device 213 is the device that is identified by the content of the request for the recovery code. In some examples, the second device 213 corresponds to the electronic device 101 of FIG. 1*a*.

At S205, the processor 203 then receives a response to the authentication request from the second device 213 via the second network connection 207. The received response comprises information to authenticate the identity of the second device 213. In some examples, the received response comprises an authentication credential as described in relation to FIG. 1*b*.

At S207, the processor 203 authenticates the second device 213 using the information to authenticate the identity of the second device 213. In examples, the authentication process comprises comparing the received information to authenticate the identity of the second device 213 with information stored in the storage device 209. In examples where the information to authenticate the identity of the second device 213 comprises a digital certificate, the authentication S207, may comprise authenticating the content, formatting and validity of the digital certificate.

If the authentication S207 indicates that the received information to authenticate the identity of the second device 213 is successful then, at S209, the processor 203 transmits the recovery code to the second device 213 via the second network connection 207. In examples, a successful authentication is achieved when the information to authenticate the identity of the second device 213 is found to be valid.

In examples, the content of the authentication request transmitted S203 by the processor 203 is dependent on a type of the second network connection. In examples where the second network connection 207 corresponds to a network that is registered with the electronic device 210, such as a company ethernet on which the electronic device 201 is present, the content of the authentication request may comprise a request for the second device's IP address, MAC address or GUID. Conversely, in examples where the second network connection 207 corresponds to a previously unregistered network, such as an unregistered Wi-Fi network, the content of the authentication request may comprise a request for a digital certificate. More generally, the processor 203 may associate a different trust level with different networks and different network types and associate each trust level with a different content of the authentication request.

In examples where the request for a recovery code received S201 from the first device 211 comprises identity information, the processor 203 may, prior to transmitting the request for authentication, compare the identity information with identity information stored in the memory 209. The identity information may include identity information of the first device 211, the second device 213 or both devices. Thus, the processor 203 may ensure that the received request is a request that relates to a registered device, is transmitted from a registered device, and that the authentication request is transmitted to the correct electronic device.

In some examples, the first network connection 205, or the second network connection 207, or both may be a wireless cellular connection. In such examples, the information to authenticate the identity of the second device 213 in the request for a recovery code may correspond to an identifier of a cellular communication device within the second device 213 that enables a network connection.

Figure 3A:
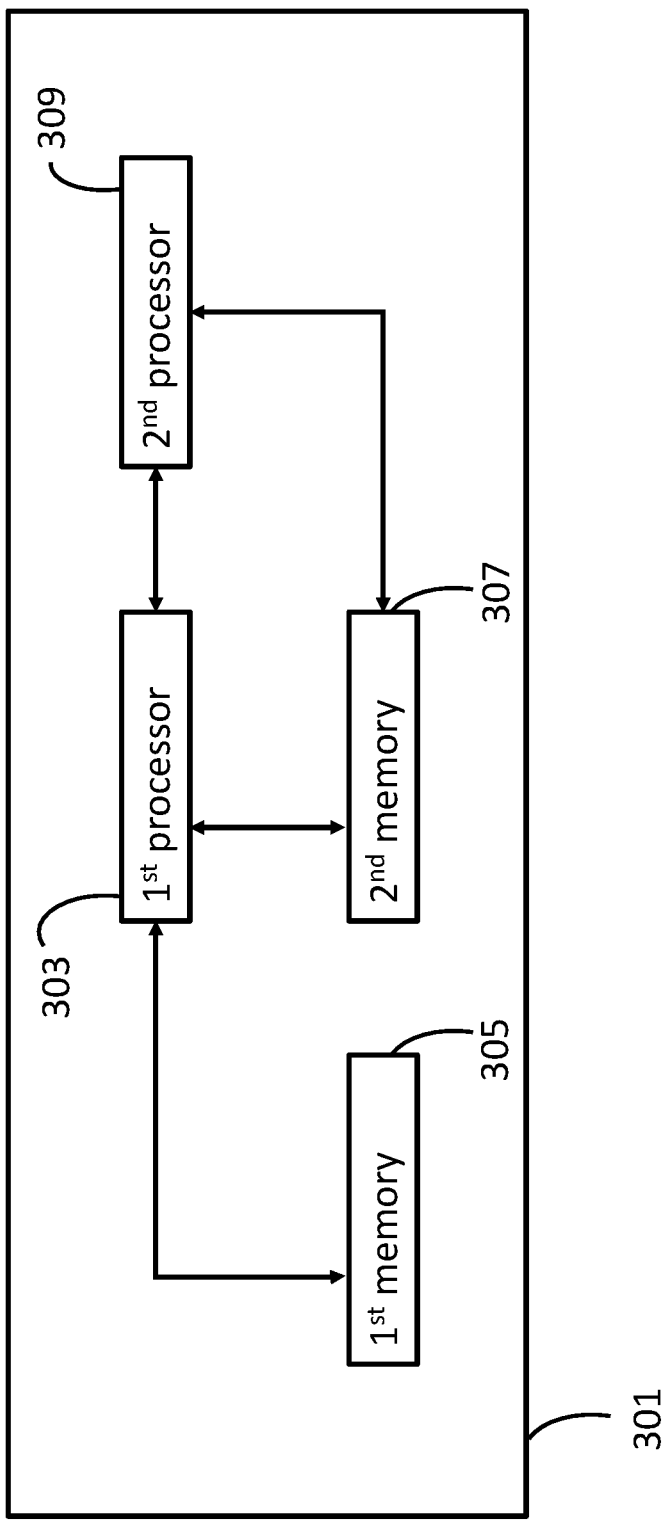
FIG. 3a is a block diagram of yet another electronic device.

FIG. 3a illustrates an example electronic device 301, such as a computer device. The electronic device 301 comprises a first processor 303, a first memory 305, a second memory 307, and a second processor 309.

In some examples where the first processor 303 comprises an EC, then the EC may be to provide services that are available during boot-up of the electronic device. For example, the EC may be to provide network communication capability during the boot process, prior to loading of an operating system. Such network capability may include Ethernet, cellular communications such as 4G and 5G, Wi-Fi, Bluetooth, etc.

As indicated in FIG. 3a, the first processor 303 is able to communicate data between itself and each of the memories 105, 107 and also with the second processor 309. The second processor 309 is also able to communicate data with the second memory 307.

Figure 3B:
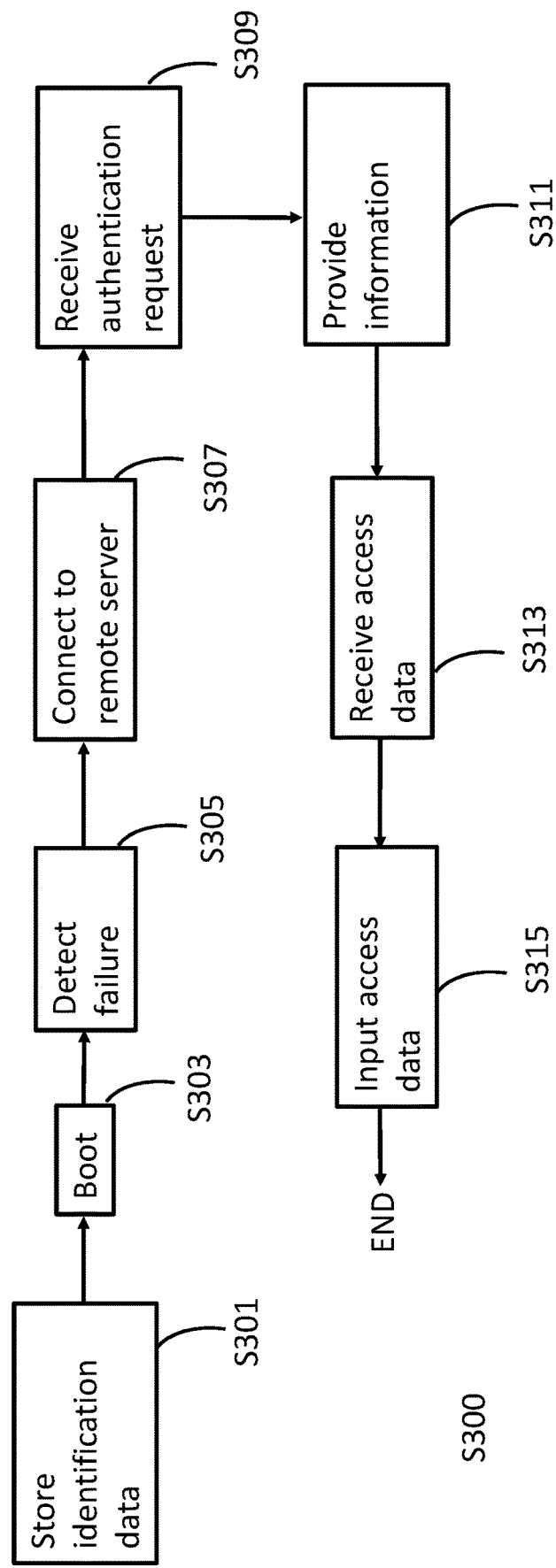

FIG. 3b illustrates an example method S300 of operation of the electronic device 301 of FIG. 3a. At S301, identification data is stored in the first memory 305. In some examples, the first memory 305 may be a secure memory. The storage S301 of the identification data may be accomplished prior to issuing the electronic device 301 to a user. For example, a system administrator may store the identification data when first setting up the electronic device 301 for a user. The identification data may also be stored via a local intervention of an administrator such as by manually storing the identification data, for example using a USB memory device. Alternatively, the identification data may be stored by remote intervention wherein an administrator stores the identification data via a network connection. The identification data may be a private encryption key.

At S303, upon booting of the electronic device 301, instructions are executed on the first processor 303 of the device 301 to initiate the device 301. The device initiation may include instructions to obtain data from the second memory 307 to complete initiation of the electronic device 301. In examples, the data obtained from the second memory 307 may comprise parts of an operating system for the electronic device 301, or other data for operation of the electronic device 301. The data stored in the second memory 307 is encrypted with an encryption system that renders the data unreadable to the processor 303 without prior decryption. As a result, when attempting to obtain the data from the second memory 307, the first processor 303 detects at S305 that there is a failure to decrypt the data from the second memory 307. The reason for the failure can be, for example, as described in relation to FIG. 1b

Upon detecting S305 the failure to decrypt the data stored in the second memory 307, the first processor 303 connects, at S307, to a remote server via a network connection. In some examples, the processor 303 establishes the network connection to the remote server upon detection S305 of the failure. In other examples, a pre-existing network connection is employed. In some examples, the network connection may be established by the remote server. The remote server may, in examples, correspond to the device 201 of FIG. 2a.

The remote server determines whether a recovery request related to the electronic device 301 has been received from another electronic device. In examples, the determination includes a determination as to whether a recovery request including information identifying the electronic device 301 has been received at the remote server from the other electronic device. In examples, the other electronic device corresponds to the first device of FIG. 2a. In examples, the information identifying the electronic device 301 comprises an IP address, a media access control (MAC) address, a globally unique identifier (GUID), or any other data that can be used to uniquely identify, within a network of devices, the electronic device 101 to which the request relates.

In examples, if the recovery request has been received at the remote server then the remote server transmits an authentication request to the first processor 303. Thus, the authentication request is based on the received recovery request. In some examples, the authentication request includes a request for information identifying the electronic device 301. The authentication request is generated based on a recovery request received at the remote server from another electronic device.

At S309, the first processor 303 receives the authentication request from the remote server. Upon receipt S309 of the authentication request, the first processor 303, at S311 provides information identifying the electronic device 301 to the remote server.

The information identifying the electronic device 301 provided may be generated using the stored identification data. In examples, the information identifying the electronic device 301 may correspond to an electronic certificate generated using a private key, such as a private key stored in the electronic device 301 or any other data that can uniquely identify the electronic device 301 within a network of devices.

The remote server may examine the information identifying the electronic device 301 to determine whether the electronic device 301 is correctly authenticated. In examples, the examination comprises comparing the information identifying the electronic device 301 with a stored list of valid identification information. In other examples, where the information identifying the electronic device 301 comprises a digital certificate, the examination comprises using a public encryption key to validate the certificate. In some examples, information from a remote certificate issuing authority is used during the validation process.

If the examination of the information identifying the electronic device 301 indicates that the electronic device 301 is correctly authenticated, then the remote server may issue access data for the second memory 307 and transmit a message including the access data via the network connection to the electronic device 301. At S313, the first processor 303 receives the issued access data and at S315 inputs the access data to the second processor 309. The second processor 309 may then use the access data to decrypt the data stored in the second memory 307.

The access data is input to the second processor 309 using a virtual keystroke in a manner wherein the recovery code cannot be seen by a user. In examples, the virtual keystroke may be generated by the first processor 303 or the second processor 309. In such examples, the first processor 303 or the second processor 309 may comprise an embedded controller (EC). In examples, the virtual keystroke may be generated in a password entry screen of the electronic device 301 with the keystroke replaced by a substituted character. The substituted character may be a blank space. In some examples, the character is input using a same color as the background thereby rendering it obscured to the user. In some examples, the virtual keystroke may be implemented by an EC providing instructions to a keyboard controller of the electronic device 301. In examples, a plurality of keystrokes may be input.

When the second processor 309 has used the password to decrypt a part, or all, of the data in the second memory 307, then the boot process of the electronic device 301 may continue, and the device 301 may operate in a normal manner.

In some examples, the authentication request comprises a request for a digital certificate. The requested digital certificate may be a certificate that is generated by the first processor 303 using the identification data stored in the first memory 305. In such examples, the identification data may comprise a private key as is described in relation to FIG. 1b.

In some examples, the electronic device 301 is further to perform a restart upon receipt of the access data.

Figure 4:
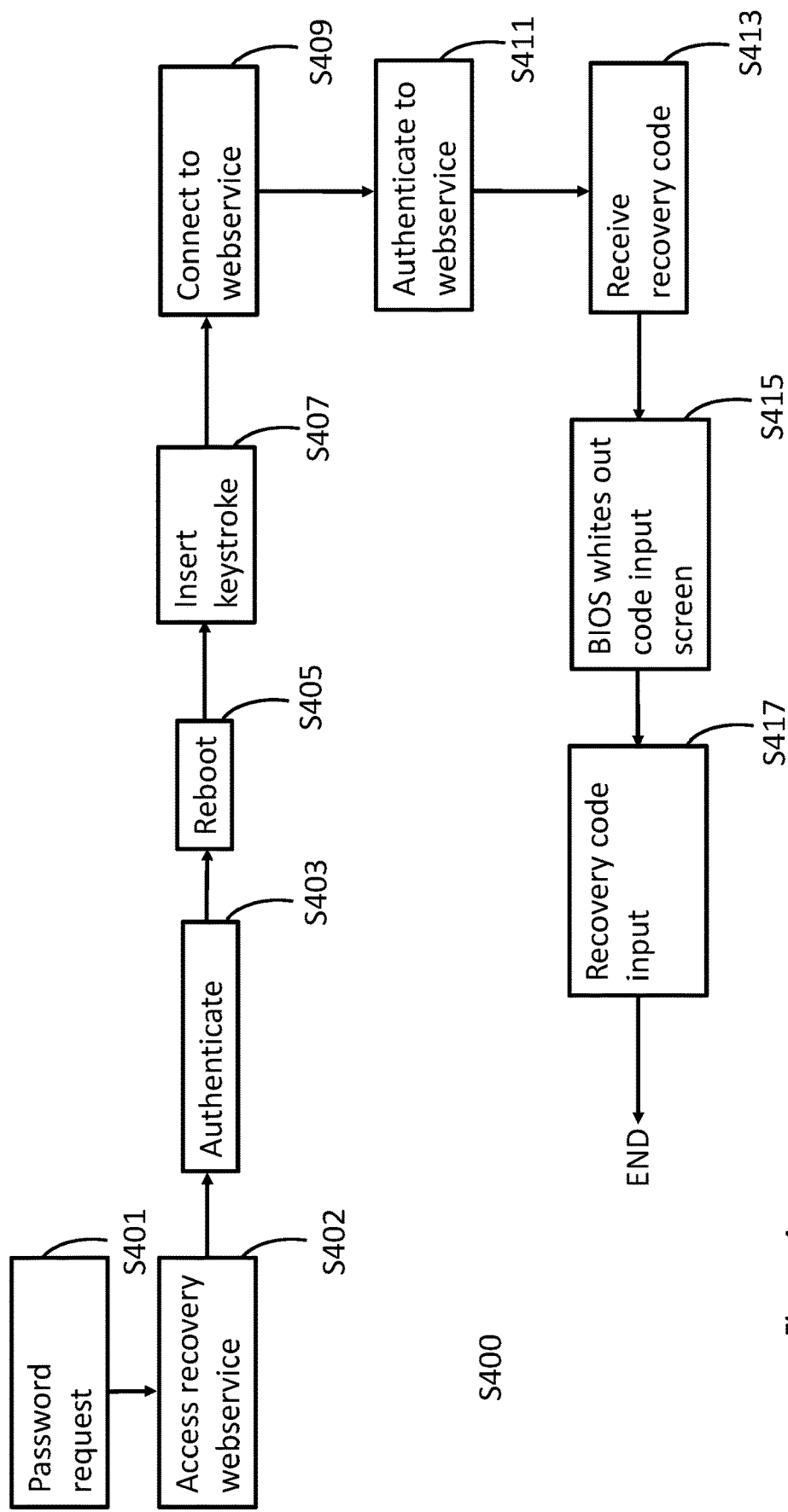

FIG. 4 illustrates another example method S400 of operation of an electronic device. The method S400 of this example can be applied to the electronic device 101 of FIG. 1a or to the electronic device 301 of FIG. 3a.

The method S400 of FIG. 4 is for application in a situation S401 in which an electronic device 101, 301 is in a state where a password is requested for decryption of data in a memory of the device.

At S402, a webservice device is accessed by a user device. In examples, the user device is a device operated by a user of the electronic device 101, 301. In examples, the user device is a cellular communication device. In some examples, the webservice device corresponds to the webservice device 201 of FIG. 2a, and the user's device corresponds to the first device of FIG. 2a. In such examples, the second device of FIG. 2a corresponds to the electronic device 101 or 301 of FIG. 1a or 3a respectively. The access to the webservice is achieved via a network connection. Such a network connection can be, for example a Wi-Fi connection, a cellular wireless connection, or another type of network connection.

During the access to the webservice device, the electronic device accessing the webservice device provides identity information to the webservice device.

At S403, the webservice device performs an authentication of the accessing device. The authentication may be performed by comparing the identity information with identity information stored in a memory 209 of the webservice device 201. The identity information may include identity information of the user device, the electronic device 101, 301 or both devices. Thus, the processor 203 may ensure that the received request is a request that relates to a registered device, is transmitted from a registered device, and that the authentication request is transmitted to the correct electronic device 101, 301.

At S405, the electronic device 101, 301 reboots. In some examples, the reboot process is triggered by a user input to a keyboard. In other examples, the reboot is triggered by an instruction from the processor 103, 303 of the electronic device 101, 301.

At S407 a keystroke is inserted to the electronic device 101, 301. In some examples, the keystroke is applied by a user, in other examples, the keystroke is input by an instruction from the processor 103, 303 of the electronic device 101, 301.

At S409, the electronic device 101, 301 connects to the webservice. The connection S409 may correspond to the connection as described in relation to S107 of FIG. 1b or S307 of FIG. 3b.

At S411, the electronic device performs an authentication to the webservice. In examples, the authentication can correspond to the provision of an authentication credential S109 of FIG. 1b. In other examples, the authentication can correspond to the receipt of an authentication request S309 and provision of information S311 of FIG. 3b.

At S413, upon authentication, the electronic device 101, 301 receives a recovery code. In examples, the receipt of the recovery code S413 corresponds to S111 of FIG. 1b. In other examples, the receipt of the recovery code S413 corresponds to the reception of access data S313 of FIG. 3b.

At S415, the BIOS of the electronic device 101, 301 whites-out a code-input part of a code input screen. Thus, characters that are input to the screen will not be visible to a user.

At S417, the recovery code received at S413 is input to the code input screen. Upon input of the recovery code, a processor of the electronic device 101, 301 can use the recovery code to decrypt the data stored in the second memory 107, 307 of the electronic device 101, 301. The electronic device 101, 301 can then complete the boot process.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any some examples may be used alone, or in combination with other features described, and may also be used in combination with any features of any other of the examples, or any combination of any other of the examples.

The invention claimed is:

1. A non-transitory computer-readable storage medium comprising instructions that when executed cause a processor of an electronic device to:

store authentication data in a first memory of the electronic device;

detect, during a boot process of the electronic device, a failure to decrypt data stored in a second memory;

in response to detecting the failure, connect to a webservice via a network connection;

provide, via the network connection, an authentication credential to the webservice using the stored authentication data;

receive, via the network connection, a recovery code from the webservice, wherein the recovery code is provided based on a recovery request from another electronic device; and input the recovery code to a recovery service using a virtual keystroke in a manner that the recovery code is obscured from a user, wherein the recovery service is to decrypt the data stored in the second memory.

2. The non-transitory computer-readable storage medium of claim 1, wherein the detection of the failure to decrypt data stored in the second memory is based on receipt of a keystroke to a keypad of the electronic device.

3. The non-transitory computer-readable storage medium of claim 1, wherein the detection of the failure to decrypt data stored in the second memory is based on the processor detecting that input of a recovery code is requested.

4. The non-transitory computer-readable storage medium of claim 1, wherein the virtual keystroke is effected by a controller providing instructions to a keyboard controller of the electronic device.

5. The non-transitory computer-readable storage medium of claim 1, wherein the authentication data comprises a private key and wherein the authentication credential is generated using the private key.

6. The non-transitory computer-readable storage medium of claim 1, wherein the instructions when executed further cause the processor to initiate a restart of the electronic device prior to input of the recovery code to the recovery service.

7. The non-transitory computer-readable storage medium of claim 1, wherein the network connection is a wireless cellular connection.

8. A non-transitory computer-readable storage medium comprising instructions that when executed cause a processor of an electronic device to:
receive, via a first network connection, a request for a recovery code from a first device;
in response to the request, transmit an authentication request to a second device via a second network connection,
receive a response from the second device via the second network connection, wherein the response is to authenticate an identity of the second device; and
upon successful authentication of the second device, transmit the recovery code to the second device via the second network connection.

9. The non-transitory computer-readable storage medium of claim 8, wherein the content of the authentication request is dependent on a type of the second network connection.

10. The non-transitory computer-readable storage medium claim 8 further to compare the received response from the second device with a stored list of authentication details to authenticate the identity of the second device.

11. The non-transitory computer-readable storage medium of claim 8, wherein the request for a recovery code received from the first device includes identity information and wherein, the processor is further to, prior to transmitting the request for authentication to the second device, compare the identity information with stored identity information.

12. The non-transitory computer-readable storage medium of claim 8, wherein the first network connection, the second network connection, or a combination thereof includes a wireless cellular connection.

13. An electronic device comprising a first memory, a second memory, a first processor, and a second processor, wherein the first processor is to:
store identification data in the first memory;
detect, during a boot process of the electronic device, a failure to decrypt data stored in the second memory;
in response to detecting the failure, connect to a remote server via a network connection;
receive an authentication request from the remote server, wherein the authentication request is generated based on a recovery request from another electronic device;
provide, via the network connection, information identifying the electronic device to the remote server using the stored identification data;
receive, via the network connection, access data from the remote server; and
input the access data to the second processor using a virtual keystroke in a manner that the access data is obscured from a user, wherein the second processor is to decrypt the data stored in the second memory using the access data.

14. The electronic device of claim 13, wherein the received authentication request comprises a request for a digital certificate.

15. The electronic device of claim 13, wherein, upon receipt of the access data, the electronic device is further to restart.

* * * * *